US006890132B1

(12) United States Patent
Baron et al.

(10) Patent No.: US 6,890,132 B1
(45) Date of Patent: May 10, 2005

(54) BOLT ON DRIVE ASSEMBLY FOR A CORE DRILL

(75) Inventors: Kevin F. Baron, Thousand Oaks, CA (US); Kraig M. Baron, Thousand Oaks, CA (US); Leon D. Jones, Oxnard, CA (US)

(73) Assignee: Western Saw Corporation, Oxnard (CA)

( * ) Notice: Subject to any disclaimer, the term of this patent is extended or adjusted under 35 U.S.C. 154(b) by 72 days.

(21) Appl. No.: 10/624,355

(22) Filed: Jul. 21, 2003

(51) Int. Cl.[7] .............................................. B23B 51/04
(52) U.S. Cl. ...................................... 408/204; 408/226
(58) Field of Search ............................... 408/204, 206, 408/207, 226, 703; 76/108.1, 115; B23B 51/04

(56) References Cited

U.S. PATENT DOCUMENTS

| 2,779,361 | A | * | 1/1957 | McKiff | 408/204 |
| 3,220,449 | A | * | 11/1965 | Franklin | 408/192 |
| 4,148,593 | A | * | 4/1979 | Clark | 408/204 |

* cited by examiner

Primary Examiner—Daniel W. Howell
Assistant Examiner—J Williams
(74) Attorney, Agent, or Firm—Jack C. Munro

(57) ABSTRACT

A bolt on drive assembly for a core drill which utilizes a spoked reinforcer mounted between a pair of discs. The discs are removably mounted on the tube by bolt fasteners. A drive connection is removably mounted and centrally located on a outer disc of the pair of discs. The drive connection is adapted to connect with a drive shaft to cause rotation of the tube.

8 Claims, 3 Drawing Sheets

BOLT ON DRIVE ASSEMBLY FOR A CORE DRILL

BACKGROUND OF THE INVENTION

1. Field of the Invention

The field of this invention relates to cutting implements and more particularly to the construction of a core drill.

2. Description of the Related Art

Core drills are commonly used for drilling holes in hard materials, such as concrete and masonry. These holes are then used to support a structural member, such as a post, which is used on a support member for a building structure or for forming a large diameter borehole with the borehole being used for the passage of pipe lines or conduits. A typical core drill is constructed of hard metal, such as steel, and takes the shape of a tube with hardened cutting segments mounted at one end of the tube. The opposite end of the tube is closed generally by a solid steel plate with there being a drive connection mounted on this steel plate. The drive connection is to be connected to a rotating shaft of a drive machine which will cause the tube to be rotated and affect the cutting operation. The cutting segments at one end normally comprise diamonds but also it has been known to use silicon carbide. The diamonds are held together by a suitable resin adhesive.

The plate at the closed end of the tube is of substantial thickness, generally one half to one and a half inch thick. These core drills are frequently designed to be from six inches to thirty-six inches and more in diameter. The steel plate at the closed end is of substantial weight. It is important to have an extremely strong member at this closed end because all the force from the driving machine is being transferred to this member to the tube. The force encountered by the tube in cutting the hole in masonry and concrete is substantial so it is important that the plate at the closed end of the tube establish an extremely strong connection. However, most often these core drills are carried by a human from one location to another. The plate member at the closed end of a sixteen inch core drill is fifteen pounds heavier than the core drill constructed in accordance with this invention. That extra fifteen pounds of weight can actually make the difference as to whether a core drill can be carried by a single human from one location to another. It is readily apparent that the greater the diameter of the core drill the greater of the additional amount of weight. It would be desirable to design some type of closed end structure for a core drill which would be substantially lighter in weight than if a solid plate is used.

At times, when operating of a core drill, a plug of material, which would be normally masonry or cement, gets caught within the hollow chamber of the core drill adjacent the closed end plate. At the present time, access into this area is only provided through the open end of a core drill which means some kind of an elongated member has to be extended up through the hollow chamber of the core drill and this member wedged against the caught material and somehow loosen it to dislodge it. It would be desirable to construct a core drill so that the closed end portion of the core drill could be removed from the tube which would provide immediate local access to any wedged material that is caught within the hollow chamber and located directly adjacent the closed end.

SUMMARY OF THE INVENTION

A first basic embodiment of the present invention is a bolt on drive assembly for a core drill which uses a cylindrical open ended tube which has a cutting edge at one longitudinal end and an open end at an opposite longitudinal end. A mounting means is provided at the open end with a spoked reinforcer, which has a center hub from which extends radially a plurality of spoked members, being attached to this mounting means. An outer disc is mounted on the spoked reinforcer covering same and also onto the mounting means. A drive connection is centrally mounted on this outer disc with this drive connection adapted to connect to a drive shaft to cause rotation of the tube. A series of removable fasteners are used to secure the outer disc and the spoked reinforcer to the mounting means.

A further embodiment of the present invention is where the first basic embodiment is modified by the mounting means as being defined as a mounting ring which is mounted inside the hollow cylindrical chamber of the cylindrical tube.

A further embodiment of the present invention is where there is included an inner water stop disc located across the hollow chamber of the tube mounted against the inside surface of the spoked reinforcer.

A further embodiment of the present invention is where the first basic embodiment is modified by the drive connection being defined as a coupler which is threadably securable to a drive shaft.

A further embodiment of the present invention is where the just previous embodiment is modified by the coupler being mounted by bolt fasteners to an outer disc.

A second basic embodiment of the present invention is directed to a method of making a core drill which comprises the steps of utilizing a cylindrical open ended tube which has a hollow chamber, forming a cutting edge at one end of this tube, forming a mounting means at an opposite end of this tube and bolting on a spoked reinforcer onto the mounting means where the spoked reinforcer is connected to a driving connection.

A further embodiment of the present invention is where the second basic embodiment is modified by prior to bolting inserting a thin water stop disc across the hollow chamber located against the spoked reinforcer essentially closing of this hollow chamber to prevent passage of water therethrough.

A further embodiment of the present invention is where the just previous embodiment is modified by after the bolting step placing a second thin disc across the hollow chamber, further providing a stop for water, covering the outside surface of the spoked reinforcer with the bolting also functioning to secure this second thin disc in place.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
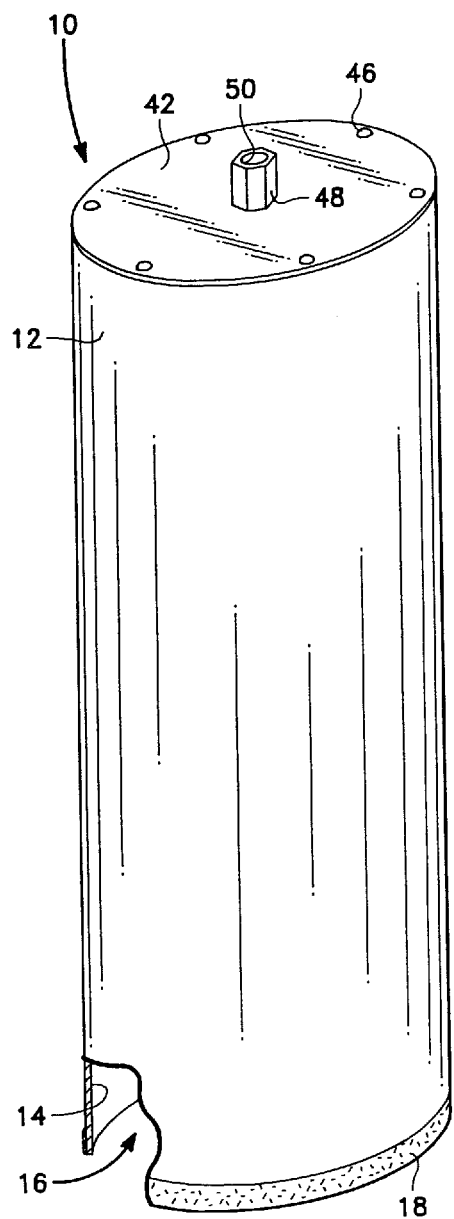
FIG. 1 is an external isometric view of a first embodiment of core drill constructed in accordance with this invention.
Figure 2:
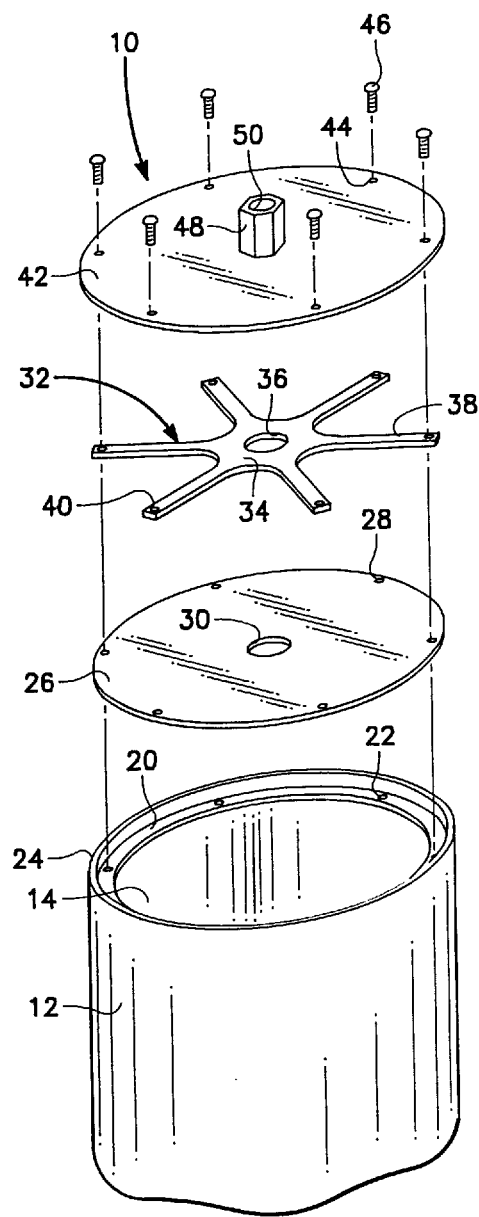
FIG. 2 is an exploded isometric view of the bolt on drive assembly of the first embodiment that is constructed in accordance with this invention where the connector of the drive assembly is welded in location onto an outer disc.

Referring particularly to the drawings, there is shown the first embodiment 10 of core drill in FIGS. 1 and 2 constructed in accordance with this invention. The core drill 10 has a body that is in the shape of a tube 12. Typically, this tube 12 will be of a diameter of between six and sixteen inches. The tube 12 has a through hollow chamber 14. The hollow chamber 14 at one longitudinal end 16 is open. On the peripheral edge about the end 16 there is adhesively or otherwise permanently affixed a series of cutting segments 18. Generally, the cutting segments 18 will comprise diamonds. The cutting segments 18 is what produces the cut within the material that is being cut, which is generally cement or masonry. This cut is produced by rotating of the tube 12.

At the opposite longitudinal end of the tube 12 there is located a mounting ring 20. The mounting ring 20 has a series of spaced apart threaded holes 22. The mounting ring 20 is generally no more than one-half to three-quarters of an inch wide and is to be fixedly mounted to the wall of the hollow chamber 14 a slight distance spaced from the outer edge 24 of the tube 12. Normally, this spacing of the mounting ring 20 will be no more than one-half inch. The mounting ring 20 is generally fixedly secured to the tube 12 by welding.

Water stop disc 26 is placed within the hollow chamber 16 and is supported on the mounting ring 20. Adjacent the peripheral edge of the disc 26 there is located a series of through holes 28. A single through hole 28 is to align with a single threaded hole 22. The disc 26 has a center hole 30. The center hole 30 is to facilitate handling of the disc 26 to locate such on the mounting ring 20.

A spoked reinforcer 32 is then to be placed on the water stop disc 26. The spoked reinforcer 32 has a centrally located hub 34 which also has a center hole 36 to facilitate handling. Extending radially outward from the hub 34 are a plurality of spaced apart radial arms 38. There are shown six in numbers of the arms 38 in the first embodiment of FIG. 2 and eight in number of the arms 38 in the second embodiment 11 FIG. 3 of spoked reinforcer 33. Typically, there will only be used six in number of the arms 38 when the diameter of the tube 12 is thirty inches and less. When the diameter of the tube 12 exceeds thirty inches, then there will generally be used eight in number of the arms 38. Directly adjacent the outer end of each of the arms 38 is a through hole 40. A through hole 40 is to be in alignment with a through hole 28.

Figure 3:
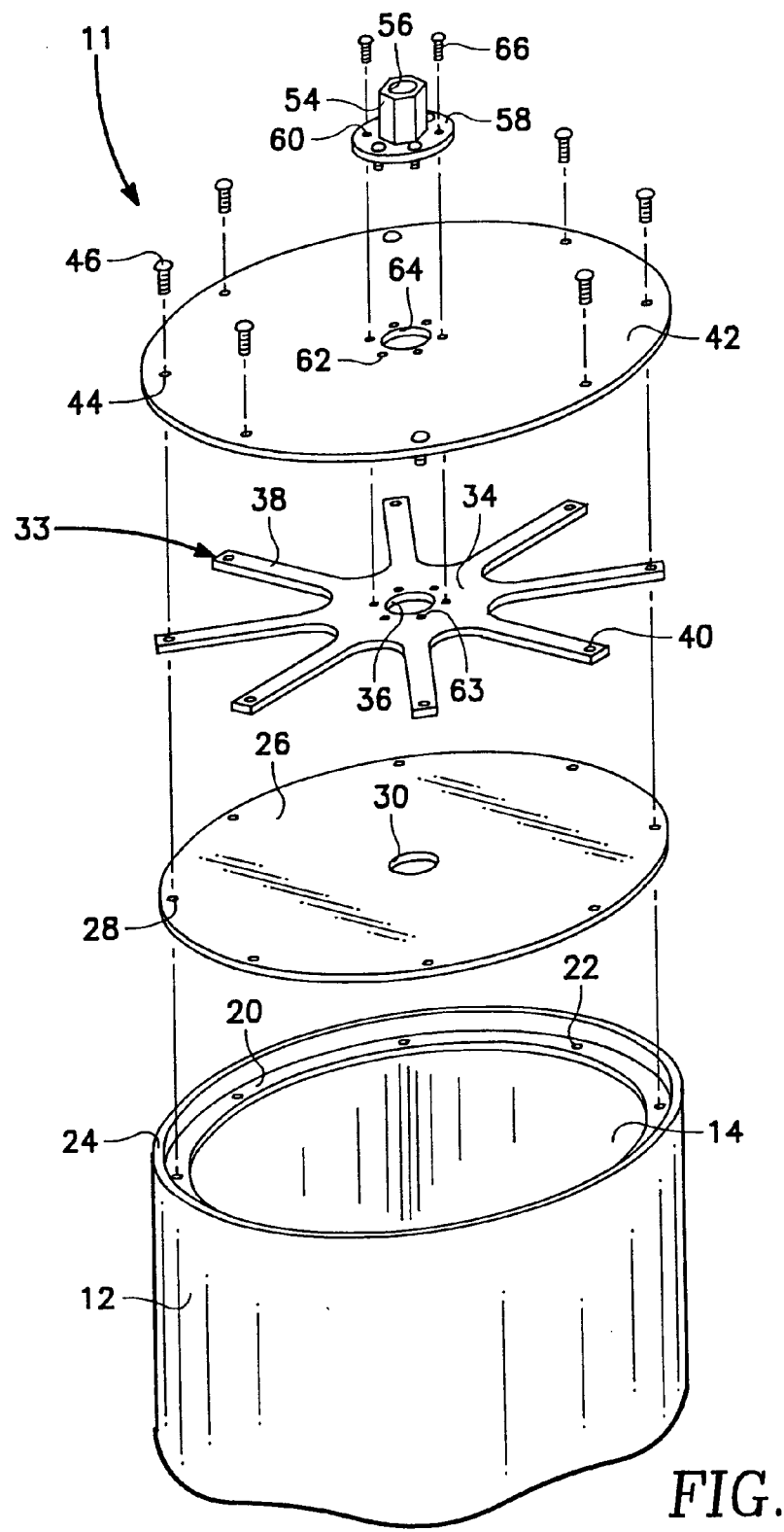
FIG. 3 is a view similar to FIG. 2 but of a second embodiment where the drive connection instead of being welded is bolted in place on the outer disc.

Mounted also within the hollow chamber 14 and located against the exterior surface of the spoked reinforcer 32 is an outer disc 42. Outer disc 42 functions as a cover. The outer disc 42 has a series of through holes 44 located directly adjacent the peripheral edge of the disc 42. There is to be a through hole 44 to align with a through hole 40 for each of the radial arms 38. A bolt fastener 46 is to be placed through each of the aligned holes 44, 40, 28 and then be threadably tightened within the threaded hole 22. This will secure in place the drive assembly which is composed minimally of the spoke reinforcer 32 and the outer disc 42. The only reason for the disc 26 is to prevent the passage of water through the hollow chamber 14 and prevent such from being discharged from the tube 12 past the mounting ring 20. Water is frequently used when drilling of cement and masonry in order to minimize the creation of heat. The drive assembly, which is composed of water stop disc 26, spoke reinforcer 32 and outer disc 42, as shown in FIGS. 2 and 3, is exceedingly strong but is much lighter in weight than if it were a completely solid steel plate. This has an advantage in that the overall core drill is lessened in weight therefore facilitating its carryablity by a human.

Figure 4:
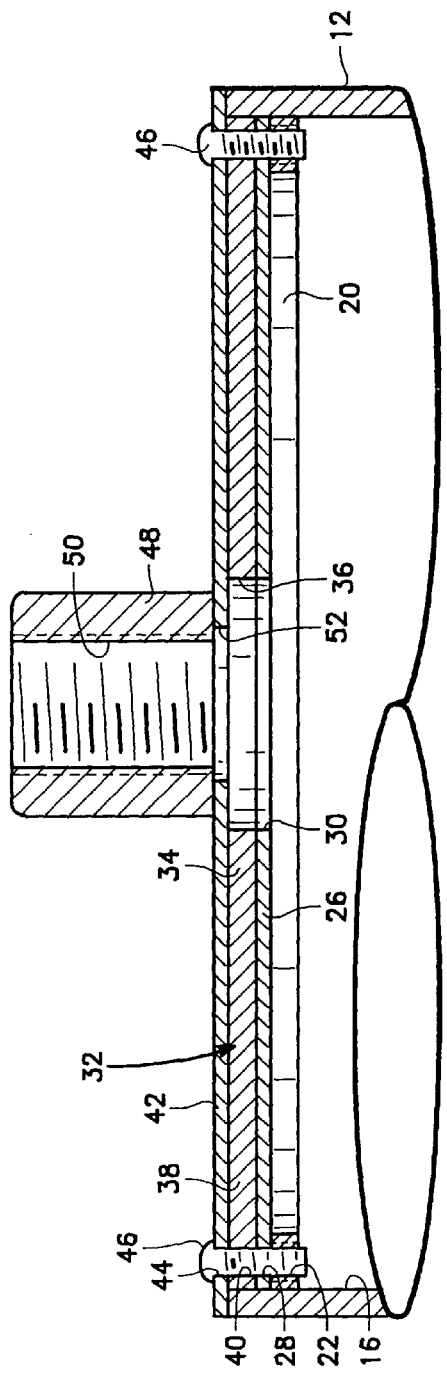
FIG. 4 is a transverse cross-sectional view through the assembled drive assembly of the core drill of the first embodiment of this invention.

In FIG. 2, centrally mounted on the outer disc 42 is a drive connection 48. Drive connection 48 is shown to be in the shape of a hexagonal nut and has an internal threaded opening 50. This internal threaded opening 50 is to connect to a drive shaft of a driving machinery, which is not shown. The driving machinery is to affect rotation of the drive connection 48 and the entire core drill 10. The drive connection 48, shown in FIGS. 1, 2 and 4, is to be welded about center hole 52 formed within the outer disc 42.

Figure 5:
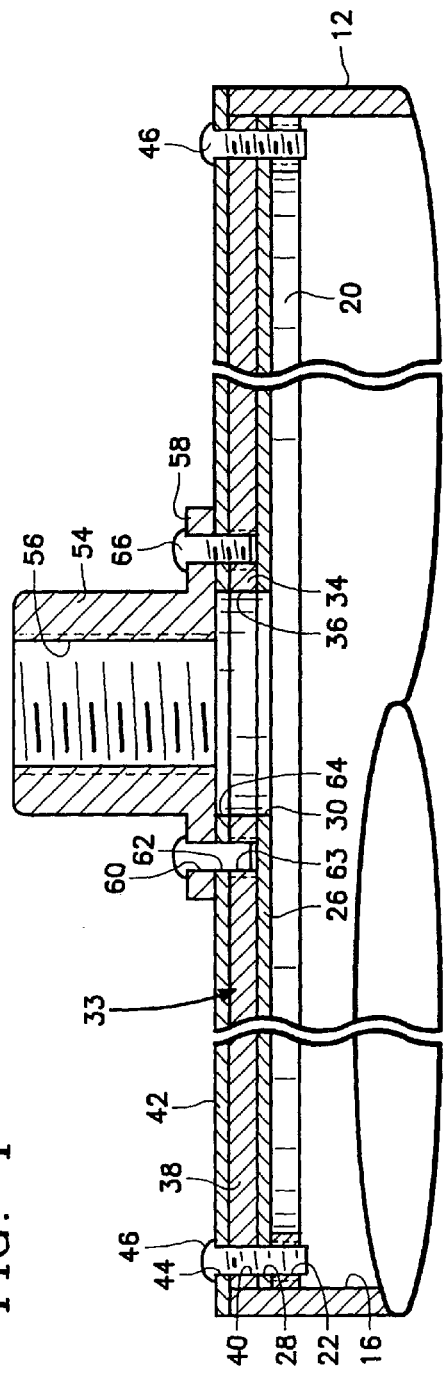
FIG. 5 is a view similar to FIG. 4 but of the second embodiment of this invention.

Referring particularly to FIGS. 3 and 5 of the drawings, there is shown the second embodiment 11 which is directed to a modified version of a drive connection 54 which is again in the shape of a hexagonal nut which has an internally threaded opening 56. The drive connection 54 is fixedly secured as by welding or integral with an attaching flange 58. Formed within the attaching flange 58 are a series of through holes 60. Each through hole 60 is to align with a through hole 62 formed within the outer disc 42 and also with a threaded hole 63 formed within the hub 34 of the spoked reinforcer 33. The holes 62 are located about center hole 64 formed within the outer disc 42. Connecting with each set of aligned holes 60 and 62 is a bolt fastener 66. It is to be understood that there is a separate bolt fastener 66 for each set of aligned holes.

The advantage of the second embodiment of this invention is that the driving connection can be removed from the outer disc 42 if for any reason such would fail. In FIGS. 1 and 2, if the driving connection 48 fails, replacement of the outer disc 42 will be required. It is to be understood that a shaft from a machine that is to cause rotation of the tube 12 is to be threadably connected to the threaded connection 56.

Typically, the thickness of each of the spoke reinforcers 32 would be in the range of three-eights to one-half of an inch. By removal of the drive assemblies in both FIGS. 1 and 3, access to the upper end of the hollow chamber 14 is permitted in order to affect dislodgement of any wedged material that may be caught in the area of the hollow chamber 14. The reason this is permitted is by the removing of the bolts, which permits the outer plate 42, spoked reinforcer 32 or 33 and water stop disc 26 to be removed from the mounting ring 20 to provide access to the hollow chamber 14.

What is claimed is:

1. A bolt on drive assembly for a core drill comprising:

a cylindrical tube having a cutting edge at one longitudinal end and an open end at an opposite longitudinal end;

a mounting means mounted at said open end;

a spoked reinforcer, said spoked reinforcer having a center hub from which extends radially a plurality of spoked members, said spoked members being attached to said mounting means;

an outer disc mounted onto said spoked reinforcer and also onto said mounting means;

a drive connection centrally mounted on said outer disc, said drive connection adapted to connect to a drive shaft to cause rotation of said tube; and a series of removable fasteners to secure said outer disc and said spoked reinforcer to said mounting means.

2. The bolt on drive assembly as defined in claim 1 wherein:

said tube having a hollow chamber, said mounting means comprising a mounting ring, said mounting ring being located within said hollow chamber.

3. The bolt on drive assembly as defined in claim 1 wherein:

a water stop disc mounted between said spoked reinforcer and said mounting means, said water stop disc to function to prevent the passage of water from within said hollow chamber through said open end.

4. The bolt on drive assembly as defined in claim 1 wherein:

said drive connection comprising a coupler adapted to be threadably secured to a drive shaft.

5. The bolt on drive assembly as defined in claim 4 within:

said coupler being removably mounted with bolt fasteners to said stoked reinforcer.

6. A method of making a core drill comprising the steps of:

utilizing a cylindrical open ended tube which has a hollow through chamber;

forming a cutting edge at one end of said tube;

forming a mounting means at an opposite end of said tube; and bolting a spoked reinforcer onto said mounting means where said spoked reinforcer is connected to a driving connection.

7. The method as defined in claim 6 wherein prior to the bolting step there is the additional step of inserting a first thin disc across said hollow chamber essentially closing said hollow chamber to prevent passage of water therethrough with said bolting also functioning to secure said first thin disc in place.

8. The method as defined in claim 7 wherein prior to the bolting step there is the additional step of placing a second thin disc across said hollow chamber covering said spoked reinforcer with said bolting also functioning to secure said second thin disc in place.

* * * * *